United States Patent
Lauper et al.

(10) Patent No.: US 7,249,111 B1
(45) Date of Patent: Jul. 24, 2007

(54) METHOD OF ASSIGNING VALUE CODES

(75) Inventors: Karin Busch Lauper, Bern (CH); Pierre-Alain Etique, Hinterkappelen (CH)

(73) Assignee: Swisscom Mobile AG, Bern (CH)

(*) Notice: Subject to any disclaimer, the term of this patent is extended or adjusted under 35 U.S.C. 154(b) by 0 days.

(21) Appl. No.: 09/959,735

(22) PCT Filed: May 3, 1999

(86) PCT No.: PCT/CH99/00182

§ 371 (c)(1),
(2), (4) Date: Nov. 5, 2001

(87) PCT Pub. No.: WO00/67210

PCT Pub. Date: Nov. 9, 2000

(51) Int. Cl.
*G06Q 99/00* (2006.01)
*H04K 1/00* (2006.01)
*H04L 9/00* (2006.01)

(52) U.S. Cl. .................. 705/76; 705/16; 705/67; 705/79; 340/504; 379/100

(58) Field of Classification Search .............. 705/76, 705/16; 340/504
See application file for complete search history.

(56) References Cited

U.S. PATENT DOCUMENTS

| | | | | |
|---|---|---|---|---|
| 4,517,412 A | * | 5/1985 | Newkirk et al. | 349/114.19 |
| 4,978,839 A | * | 12/1990 | Chen et al. | 235/375 |
| 6,272,535 B1 | * | 8/2001 | Iwamura | 709/217 |
| 6,477,243 B1 | * | 11/2002 | Choksi et al. | 379/100.06 |
| 6,656,430 B2 | * | 12/2003 | Sheppard, Jr. et al. | 422/63 |
| 6,707,580 B1 | * | 3/2004 | Bloomfield | 358/402 |
| 2001/0018660 A1 | * | 8/2001 | Sehr | 705/5 |
| 2003/0061097 A1 | * | 3/2003 | Walker et al. | 705/14 |

FOREIGN PATENT DOCUMENTS

| | | |
|---|---|---|
| DE | 197 54 384 | 6/1999 |
| EP | 0 827 119 | 3/1998 |
| GB | 2 305 393 | 4/1997 |
| WO | WO 96/38801 | 12/1996 |
| WO | WO 98/42173 | 10/1998 |

* cited by examiner

*Primary Examiner*—Firmin Backer
(74) *Attorney, Agent, or Firm*—Oblon, Spivak, McClelland, Maier & Neustadt, P.C.

(57) ABSTRACT

Method for distribution of value codes configured to be cashed in to obtain credit for services subject to charges. The value codes are generated and stored in a database of a value code issuer. A value code is ordered by a customer through transmission of order data, containing at least one monetary amount value, via an order channel, to the value code issuer. A delivery number, linked in the database with the value code, is transmitted via a delivery channel to the customer, and the receipt of the transmitted delivery number is confirmed by the customer through transmission of at least one part of the delivery number via a confirmation channel to the value code issuer. A value, linked in the database to the monetary amount value, is transmitted via a delivery channel to the customer, and a monetary amount value corresponding to at least the monetary amount value linked to the confirmed value code is charged to the customer.

10 Claims, 1 Drawing Sheet

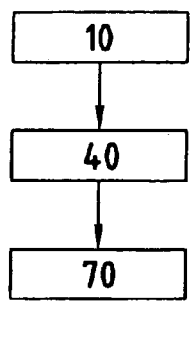
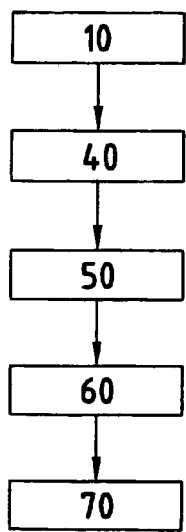
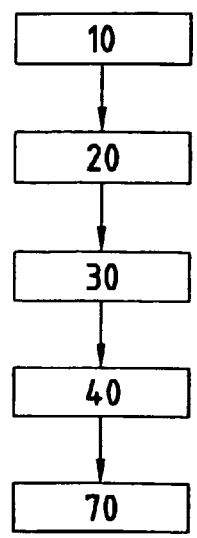
FIG. 1a  FIG. 1b  FIG. 1c
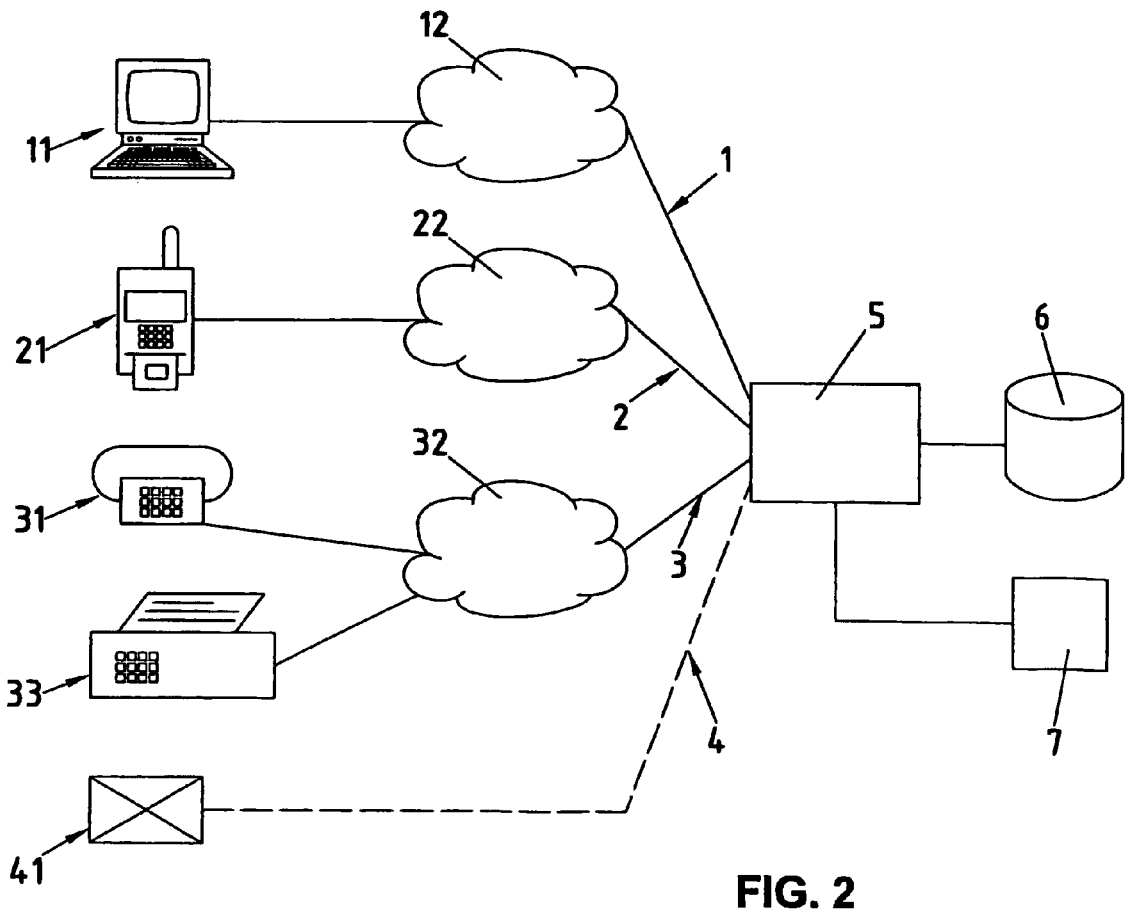
FIG. 2

METHOD OF ASSIGNING VALUE CODES

This invention relates to a method of distributing value codes. In particular, this invention relates to a method of distributing value codes which are able to be cashed in to obtain credit for services subject to charges.

Described in the published patent application EP 827 119 A1 is a method for loading or reloading a data carrier card with a monetary amount value. According to the method described in EP 827 119 A1, the purchase value of a value card available at a great many public points of sale is loaded or reloaded onto a particular data carrier card, in particular an SIM card, after a value code located on this value card has been transmitted to a service center.

An alternative method for loading telephone cards for mobile radio telephones with a value card is described in the patent application EP 848 537 A1. According to the method described in EP 848 537 A1, the sale of a telephone card, in particular an SIM card, is registered in a customer database, and the prepaid telephone card is activated only after the user enters a secret number, defined by him, when making the first outgoing telephone call. The credit amount is not stored on the card, but rather in a user account. To reload the card credit, the user calls a service number and indicates, in addition to the secret number, a credit card number or a value code of a value card, after which the user account is increased by an amount to be reloaded.

Value cards with value codes stored thereon, as are described in the published patent application EP 827 119 A1, can be used in countless application areas since the value codes stored on a value card can be used not only for loading telephone cards or other data carrier cards with a monetary amount value, but these value codes can be cashed in to obtain credit for the most various services subject to charges. However, the distribution of value codes by means of a value card as carrier has the drawback that the manufacture of these value cards entails costs that cannot be passed on to the customer since the value cards would then lose their attractiveness among customers. In addition to the manufacturing costs, sale of these value cards is also continually linked to costs since the operators of points of sale accessible to the public do not want to sell these value cards without a profit margin. These manufacturing and sales costs are typically borne by the service provider, for example the operator of a telecommunications network, since the customers expect to receive services corresponding to the monetary amount value of the value card. Finally, it should be mentioned that the disposable value cards are an unnecessary burden on the environment.

It is the object of this invention to propose a new and better method of distributing value codes which in particular does not have the drawbacks described above.

This object is achieved according to the present invention through the elements of the independent claim. Further advantageous embodiments follow moreover from the dependent claims and from the description.

In particular, these objects are achieved through the invention in that a value code, which is generated and is stored in a database of a value code issuer and which can be cashed in to obtain credit for services subject to charges, is ordered by a customer through transmission of order data via an order channel to the value code issuer, the order data containing at least one monetary amount value, in that a delivery number is transmitted over the delivery channel to the customer before transmission of the value code to the customer, and the receipt of the transmitted delivery number is confirmed by the customer through transmission of at least part of the delivery number to the value code issuer via a confirmation channel, in that a value code is transmitted to the customer via a delivery channel, this transmitted value code being linked in the said database with the said monetary amount value, and in that a monetary amount value corresponding to at least the monetary amount value linked to the confirmed value code is charged to the customer. This method has the advantage that an interested customer is able to order and obtain a value code directly, without intermediate trade, from the value code issuer via an order channel, for example a telecommunications network, for instance a mobile network or a fixed network, e.g. the public switched telephone network or the Internet, no physical value cards having to be produced, since also the delivery channel is able to comprise a telecommunications network that corresponds to the order channel, for example, or which differs from the order channel, and this being possible twenty-four hours a day without night shifts.

This procedure has the further advantage that the value code issuer receives a return confirmation from the customer before the value code is delivered, so that, for instance, no inactive value codes remain in the database that have never been confirmed.

In a preferred embodiment variant, the said order data comprise indications about how the costs for an ordered value code are able to be charged to the customer. For example, they contain a credit card number, a billing address, a bank connection with an account number or a customer identification, for instance together with an indication about the desired mode of payment.

In an embodiment variant, the said order data contain indications about how an ordered value code is able to be transmitted to the customer. For example, they contain indications for determining the desired delivery channel and addressing information relating to this desired delivery channel, for instance a telephone or fax number, a postal delivery address, an e-mail or network address, or a customer identification, on the basis of which a delivery mode and a delivery address can be determined.

In a preferred embodiment variant, receipt of the transmitted value code is confirmed to the value code issuer, through transmission of confirmation information containing, for instance, at least one part of the value code, via a confirmation channel corresponding, for example, to the said order channel and/or to the said delivery channel, before a monetary amount value is charged to the customer.

In an embodiment variant, the confirmed value code is activated in the said database only after receipt of the respective confirmation. This has the advantage that a value code can then be used only if the customer has confirmed its receipt, so that a respective customer is not able to cash in any value code and later dispute having received it, for example.

The above-mentioned delivery number is preferably linked in the database with the value code before it is transmitted to the customer. This has the advantage that the delivery number is able to be used repeatedly by the customer, i.e. is able to be transmitted to the value code issuer to request the value code, and the value code, which is linked in the database to the delivery number, is able to be transmitted to the customer repeatedly, which is advantageous when, for instance, the confirmation of the delivery number is unsuccessful, e.g. owing to a technical problem or owing to an entry error, when the value does is not transmitted successfully to the user, or when the customer has lost the value code already transmitted to him, e.g. because he has forgotten it or has misplaced it.

An embodiment of the present invention will be described in the following with reference to an example. The example of the embodiment is illustrated by the following attached figures:

FIG. 1a shows a flow chart illustrating diagrammatically steps of the method for distribution of value codes.

FIG. 1b shows a flow chart, presented only as background information, illustrating diagrammatically steps for distribution of value codes.

FIG. 1c shows a flow chart illustrating diagrammatically the steps of the method according to the invention for distribution of value codes.

FIG. 2 shows a block diagram illustrating diagrammatically a value card issuer connected to various communications channels as well as to a database and a clearing point.

In FIG. 2, the reference numeral 5 refers to a value card issuer that has available the necessary infrastructure, including hardware and software components and, if applicable, personnel resources to carry out the function of the value card issuer in the method described in the following, i.e. to receive orders for value codes, to supply ordered value codes to the customers, and, if applicable, to receive confirmations, required in the respective variant of the method. Depending upon the embodiment variant of the inventive method, the value codes are generated at an appropriate time point in the method and are stored in a database 6 of the value card issuer. The value codes can be cashed in by those who ordered them or by those who possess them, to whom the ordering party has transmitted the value code, to obtain credit for services subjected to charges, for example for telephone calls, for obtaining goods, such as, for instance, gasoline at an automated pump, for use of public transport, or for obtaining electronic cash for payment of the most various goods and services.

The value code issuer 5 comprises, for example, one or more communications servers, commonly available on the market, which each have the necessary software and hardware components to be connected to one or more, if applicable different, communications channels 1 to 4. These communications channels 1 to 4 are used in the method according to the invention as order channels, as delivery channels and, if applicable, as confirmation channels, it being possible to use the same or a different communication channel for communication with an interested customer for ordering, delivery and, if applicable, confirmation.

The communications channel 1 comprises a telecommunications network 12, for example a fixed network, e.g. a LAN (Local Area Network) or WAN (Wide Area Network), the public switched telephone network (PSTN, Public Switched Telephone Network and/or ISDN, Integrated Services Digital Network), or the Internet, via which it is possible to communicate with the value code issuer 5 by means of communications terminals 11, for instance a personal computer suitable therefore or a suitable input terminal accessible to the public. The communication via the communications channel 1 takes place, for example, by means of e-mail or by means of data exchange via an Internet site (web page) or by means of another protocol suitable for data exchange. The communications terminal 11 includes, for example, suitable programmed software functions to communicate with the value card issuer 5 and to execute for the customer data entry, able to be automated, and commands, able to be configured by the customer, for instance.

The communications channel 2 comprises a mobile telecommunications network 22, for example a GSM, a UMTS or another mobile network, via which it is possible to communicate with the value card issuer 5 by means of mobile devices 21, for instance a mobile radio telephone suitable therefor or a suitable, communication-capable laptop or palmtop computer. The communication via the communications channel 2 takes place, for instance, by means of special short messages, e.g. SMS (Short Message Services) or USSD (Unstructured Supplementary Data Services) messages or via the user information channel. The mobile device 21 includes, for instance, suitable programmed software functions, which are stored, for instance, on the SIM card (Subscriber Identity Module) removably connected to the mobile device, to communicate with the value card issuer 5 and to execute for the customer data entries, able to be automated, and commands, able to be configured by the customer, for instance.

The communications channel 3 comprises the public switched telephone network 32 (PSTN, Public Switched Telephone Network and/or ISDN, Integrated Services Digital Network) via which it is possible to communicate with the value card issuer 5 by means of communications terminals, for instance a telephone 31 or a fax machine 33. For communication over the communications channel 3 using a telephone 31, the value code issuer 5 has available, for instance, programmed software functions and suitable hardware elements to ask the customer, by means of spoken menu presentation, to enter data and options via the keyboard of the telephone 31, or to receive data and options from the customer by speech recognition means and to report information to the customer by means of automated speech.

The communications channel 4 comprises a distribution network for communication by means of conventional paper post 41, the value code issuer 5 including, for example, programmed software functions and suitable hardware elements to produce the paper post 41 with the value code contained therein.

As shown in FIGS. 1a, 1b and 1c, the flow charts a), b) and c) contain a step 10 in which a value code is ordered by a customer through transmission of order data to the value code issuer via an above-described order channel 1 to 4, the order data containing at least one monetary amount value. The order data can moreover also contain indications as to how the costs for an ordered value code can be charged to the customer; for example it includes a credit card number, a billing address, a bank connection with an account number, or a customer identification, for instance together with an indication of the desired mode of payment. A customer identification can be used in the value code issuer 5 to call up, for example, further information relating to the customer in a database, e.g. a telecommunications network subscriber database of a telecommunications network operator. The order data can also contain indications as to how an ordered value code can be transmitted to the customer; for example, it contains indications for determining the desired delivery channel and addressing information relating to this desired delivery channel, e.g. a telephone or fax number, a postal delivery address, an e-mail or network address or a customer identification on the basis of which a delivery mode and a delivery address can be determined by the value code issuer 5, e.g. in a database, in particular a telecommunications network subscriber database.

According to FIGS. 1a, 1b and 1c, the flow charts a, b) and c) also comprise moreover a step 40 in which a value code is transmitted to the customer via a delivery channel 1 to 4, the delivery channel corresponding, for example, to the order channel, or being selected according to indications contained in the order data, and this transmitted value code being linked in the database 6 of the value card issuer to the said monetary amount value. Depending upon the delivery channel 1 to 4 used and the communications terminal 11, 21, 31, 33 used, the delivered value code is communicated in differing form to the customer and can be cashed in by the customer differently or passed on to another person for cashing in. In a personal computer 11, the value code can be shown on the screen and stored in a memory of the personal computer 11, and transmitted, for instance through suitable software functions, verbally or in printed form, for cashing in, or passed on to another person for cashing in. In a mobile device 21, the value code can be displayed on the display and can be stored in a memory, for instance on the SIM card of the mobile device 21, and be transmitted for cashing in by suitable software functions, or verbally, or can be passed on to another person for cashing in. Through a telephone device 21, the value code can be communicated to the customer in spoken form, and can be recorded by the latter by mean of audio recording or writing, and can be transmitted orally or in written form for cashing in, or passed on to another person for cashing in. By means of a fax machine 33 or by conventional paper post 41, the value code can be communicated to the customer in printed form, and can be transmitted by the customer e.g. orally or in written form, for cashing in, or passed on to another person for cashing in. It should be mentioned here that owing to the fact that the value code is impersonal and is transferable to another person, the anonymity of the person cashing in the value code is given.

According to FIGS. 1*a*, 1*b* and 1*c*, the flow charts a), b) and c) also comprise moreover a step 70 in which a monetary amount value corresponding to at least the monetary amount value linked to the confirmed value code is charged to the customer, the billing being carried out taking into consideration indications relating thereto contained in the order data. The billing can be carried out directly by the value code issuer, or, through transmission of the necessary information therefor, e.g. the monetary amount value and a customer identification, <the task> can be passed on by the value code issuer 5 to a clearing point 7 or a financial institution to carry out the billing.

As shown in FIG. 1*b*, the flow chart b) includes, in addition to the steps of the embodiment variant a), a step 50 in which receipt of the transmitted value code is confirmed to the value code issuer through transmission of confirmation information via a confirmation channel 1 to 4, which can correspond to the order channel and/or the delivery channel, before the customer is charged a monetary amount value. The confirmation data contain, for instance, at least part of the value code to be confirmed. Thanks to this additional step 50, the confirmed value code, in a further step 60 of the flow chart b), can only be activated in the said database after receipt of the respective confirmation, whereby it is ensured that a value code can only be cashed in if it has been confirmed (received) by the customer.

As shown in FIG. 1*c*, the flow chart c) of the inventive method includes, in addition to the steps of the embodiment variant a), a step 20 in which a delivery number is transmitted to the customer via a delivery channel, corresponding e.g. to the order channel or being selected according to indications contained in the order data, before transmission of the value code to the customer. According to the further step 30 of the flow chart c), receipt of the transmitted delivery number is confirmed by the customer to the value code issuer through transmission of at least part of the delivery number via a confirmation channel, that can correspond to the order channel and/or the delivery channel, before the value code is transmitted to the customer in step 40. The value code issuer 5 thereby receives a return confirmation from the customer, before the value code is delivered, without inactive value codes that have never been confirmed remaining in the database, for example. The above-mentioned delivery number is also preferably linked in the database 6 to the respective value code before it is transmitted to the customer in step 20. This has the advantage that the delivery number can be used repeatedly by the customer, i.e. can be transmitted to the value code issuer to request the value code, and the value code, which is linked in the database 6 with the delivery number, can be transmitted repeatedly to the customer, which is advantageous if, for example, the confirmation of the delivery number is not successful, e.g. owing to a technical problem or because of an entry mistake, if the value code is not successfully transmitted to the customer, or if the customer has lost the value code already transmitted to him, for instance because he has forgotten it or misplaced it.

It would also be possible to combine certain steps according to the flow charts b) or c) with one another; for example, step 50 of the flow chart b) could be inserted into the flow chart c).

Besides the sale or leasing of value code issuers 5 with suitable databases 6, in particular with a suitable communications server with the hardware and software components necessary for the method according to the invention, it can also be interesting to sell or lease to interested operators data carriers with the necessary software for control of a suitable communications server, so that the method according to the invention can be carried out. In exchange for corresponding payment, an operator of a value code issuer 5 can also carry out the method for interested parties who issue value codes, but do not want to operate any value code issuers 5 themselves.

The invention claimed is:

1. A method for distributing value codes configured to be cashed in to obtain credit for services subject to charges, comprising the steps of:
 a customer ordering a value code by transmitting order data via an order channel to a value code issuer, the order data containing at least one monetary amount value;
 the value code issuer receiving the order data from the order channel and transmitting a delivery number to the customer via a delivery channel;
 the customer receiving the transmitted delivery number and confirming the receipt thereof by transmitting at least part of the delivery number via a confirmation channel to the value code issuer;
 the value code issuer receiving the customer confirmation from the confirmation channel and transmitting the value code to the customer via the delivery channel, the transmitted value code being linked in a database with the monetary amount value by the value code issuer; and
 charging a monetary amount value corresponding to at least the monetary amount value linked to the confirmed value code to the customer.

2. The method according to claim 1, further comprising linking the delivery number in the database with the transmitted value code.

3. The method according to claim 1, further comprising the customer confirming receiving the transmitted value code by transmitting confirmation data to the value code issuer via the confirmation channel before changing the monetary amount value to the customer.

4. The method according to claim 3, further comprising activating the confirmed value code in the database only after receiving the respective confirmation.

5. The method according to claim 3, wherein the confirmation data contains at least part of the value code.

6. The method according to the claim 3, wherein the order data contains customer billing information indicating how the costs for an ordered value code are to be charged to the customer.

7. The method according to claim 1, wherein the order data contains indications as to how an ordered value code is to be transmitted to the customer.

8. The method according to claim 1, wherein at least one of the order channel and the delivery channel comprise a telecommunications network.

9. The method according to claim 1, wherein the order channel corresponds to the delivery channel.

10. The method according to claim 3, wherein the confirmation channel corresponds to at least one of the order channel or the delivery channel.

* * * * *